(12) United States Patent
Guggolz et al.

(10) Patent No.: US 8,647,232 B2
(45) Date of Patent: Feb. 11, 2014

(54) GROUP TRANSMISSION DEVICE

(75) Inventors: Manfred Guggolz, Leonberg (DE); Karl-Ludwig Krieger, Brinkum (DE); Wilhelmus Kok, Winnenden (DE); David Ulmer, Filderstadt (DE)

(73) Assignee: Daimler AG, Stuttgart (DE)

( * ) Notice: Subject to any disclaimer, the term of this patent is extended or adjusted under 35 U.S.C. 154(b) by 225 days.

(21) Appl. No.: 13/199,661

(22) Filed: Sep. 6, 2011

(65) Prior Publication Data

US 2012/0031230 A1 Feb. 9, 2012

Related U.S. Application Data

(63) Continuation-in-part of application No. PCT/EP2010/001006, filed on Feb. 18, 2010.

(30) Foreign Application Priority Data

Mar. 7, 2009 (DE) .......................... 10 2009 012 223

(51) Int. Cl.
*B60W 10/04* (2006.01)
*B60W 10/10* (2012.01)
*F16H 3/08* (2006.01)

(52) U.S. Cl.
USPC .................. 477/34; 477/39; 74/329

(58) Field of Classification Search
USPC .............................. 477/5, 6, 8, 34, 39; 74/329
See application file for complete search history.

(56) References Cited

U.S. PATENT DOCUMENTS

| | | | | |
|---|---|---|---|---|
| 4,375,172 A | * | 3/1983 | Richards et al. | 74/339 |
| 6,463,823 B2 | * | 10/2002 | Walker | 74/335 |
| 6,695,082 B2 | * | 2/2004 | Bitsche et al. | 180/65.25 |
| 7,992,459 B2 | * | 8/2011 | Krieger et al. | 74/336 R |
| 2012/0240723 A1 | * | 9/2012 | Gluckler et al. | 74/661 |

FOREIGN PATENT DOCUMENTS

| | | | |
|---|---|---|---|
| DE | 19960621 A1 | * | 6/2001 |
| WO | WO 2007031191 A1 | * | 3/2007 |

* cited by examiner

*Primary Examiner* — Tisha Lewis
(74) *Attorney, Agent, or Firm* — Klaus J. Bach

(57) ABSTRACT

In a group transmission device comprising a splitter group transmission unit and at least one active actuating unit for introducing an actuating torque into the splitter group transmission unit, an open- and/or closed-loop control unit is provided for adapting the actuating torque introduced into the splitter group transmission unit to at least one synchronized shifting operation to be executed by means of the splitter group transmission unit without synchronizing ring.

10 Claims, 3 Drawing Sheets

GROUP TRANSMISSION DEVICE

This is a Continuation-In-Part application of pending international patent application PCT/EP2010/001006 filed Feb. 18, 2010 and claiming priority of German patent application 10 2009 012 223.0 filed Mar. 7, 2009.

BACKGROUND OF THE INVENTION

The invention relates to a group transmission device including a splitter group transmission unit and an active actuating unit for introducing an actuating torque into the splitter group transmitter unit.

Group transmission devices comprising at least one active actuating unit and an open- and/or closed-loop control unit which is designed to adapt an actuating torque made available by the actuating unit to a shifting operation are already known.

WO 2007/03 1191 A1 describes a group transmission device comprising a main transmission unit and a splitter group transmission unit, the main transmission unit comprising a countershaft. On the countershaft there is provided an active actuating unit in the form of an electric motor, by means of which the countershaft and any gears non-rotatably connected thereto can be decelerated or accelerated. In this way, the speed of the countershaft can be synchronized in the group transmission device in shifting operations.

DE 10 2007 018 976 A1 likewise describes a group transmission device comprising a main transmission unit and a splitter group transmission unit, the main transmission unit comprising two countershafts. To synchronize the countershafts, active actuating units in the form of hydraulic drive systems are provided.

WO 01/92 048 A1 describes a group transmission device comprising a main transmission unit and a splitter group transmission unit, the splitter group transmission unit being provided with synchronizing means. The group transmission device comprises an active actuating unit in the form of an electric starter-generator which can decelerate and accelerate an input shaft. The active actuating unit is used to synchronize the speed of the input shaft in shifting operations of the main transmission unit.

It is the principal object of the present invention to simplify a structural design of a group transmission device.

SUMMARY OF THE INVENTION

The invention resides in a group transmission device comprising a splitter group transmission unit, at least one active actuating unit which is provided to introduce an actuating torque into the splitter group transmission unit via an input shaft, and an open- and/or closed-loop control unit which is provided to adapt the actuating torque introduced into the splitter group transmission unit to at least one shifting operation to be executed by means of the splitter group transmission unit.

The actuating unit is in this context provided to synchronize the splitter group transmission unit in the at least one shifting operation. In this way, a synchronization process within the splitter group can be shortened, whereby a higher customer comfort can be achieved. The term "synchronization of the splitter group transmission unit" should in this context in particular be understood to describe a synchronization of shifting means of the splitter group transmission unit.

The splitter group transmission unit comprises at least one shifting means without a synchronizer ring, which is at least partially connected to the actuating unit. In this way, the shifting means can be synchronized with the actuating unit in an advantageously simple manner. The term "shifting means" should in this context in particular be understood to describe a means for establishing non-rotatable connections within the group transmission device, the shifting means being provided for selecting gears and for example being in the form of a selector sleeve with corresponding selector forks. The term "synchronization" should be understood to describe a change and in particular a matching of speeds for the establishment of a non-rotatable connection. The at least one shifting means is preferably a non-synchromesh jaw clutch. The splitter group transmission unit advantageously comprises only non-synchromesh shifting means. In a particularly preferred embodiment, the main transmission unit only comprises non-synchromesh shifting means as well. The term "non-synchromesh should in this context in particular be understood to imply that there is no slipping connection between coupling elements of the shifting means as the shifting means is shifted.

This results in a particularly simple shiftability of the splitter group transmission unit so that a structural design of the whole group transmission device and in particular of the splitter group transmission unit can be simplified. The term "group transmission device" should preferably be understood to describe a transmission with at least one main transmission unit for selecting main gears and the splitter group transmission unit provided for multiplying the number of the main gears. The term "shifting operation" should in this context in particular be understood to describe an upshifting and/or downshifting operation. The term "upshifting operation" should in particular be understood to describe a shifting operation in which the overall ratio of the group transmission device is reduced. The term "downshifting operation" should in particular be understood to describe a shifting operation in which the overall ratio of the group transmission device is increased. The term "downshifting operation" should preferably be understood to describe a shifting operation in which the ratio of the main transmission unit is increased. The term "active actuating unit" should in particular be understood to describe a unit which is provided to make available an actuating torque which differs from a drive torque of a primary drive unit. The term "provided" should in particular be understood to mean specially programmed, equipped and/or designed.

In a particularly advantageous embodiment, the actuating unit is provided to pick up an actuating torque and to deliver an actuating torque. In this way, an actuating unit designed for flexible use can be provided.

It is further proposed that the open- and/or closed-loop control unit is provided to adapt and/or change the actuating torque introduced into the splitter group transmission unit during the shifting operation. In this way, a particularly fast synchronization can be achieved.

It is further proposed that the open- and/or closed-loop control unit is provided to avoid the tooth-on-tooth position of the splitter group transmission unit. In this way, a shifting comfort of the splitter group transmission unit can be increased further.

In a particularly advantageous further development, the group transmission device comprises at least one countershaft, wherein the actuating unit comprises at least one countershaft actuating means which is provided to make available an actuating torque acting on the countershaft. In this way, an advantageously fast synchronization can be achieved.

Preferably, the open- and/or closed-loop control unit is provided, in at least one opposite-direction shifting operation to be executed by means of the splitter group transmission unit, to set an actuating torque for the countershaft. In this way, opposite-direction shifting operations in particular can be executed advantageously fast. The term "opposite-direction shifting operation" should in this context in particular be understood to describe a shifting operation in which the ratio of the splitter group transmission unit and the ratio of the main transmission unit are changed in opposite directions.

In a further advantageous embodiment, the group transmission device comprises at least one input shaft, the actuating unit comprising at least one input shaft actuating means which is provided to make available an actuating torque acting on the input shaft. In this way, a synchronization of the group transmission unit can be improved further. In order to synchronize shifting operations, the actuating unit may in principle comprise the at least one countershaft actuating means or the at least one input shaft actuating means. In a particularly advantageous embodiment, the actuating unit however comprises both the at least one countershaft actuating means and the at least one input shaft actuating means.

The open- and/or closed-loop control unit is advantageously provided, in at least one same-direction shifting operation to be executed by means of the splitter group transmission unit, to set an actuating torque for the input shaft. In this way, same-direction shifting operations in particular can be executed advantageously fast. The term "same-direction shifting operation" should in this context in particular be understood to describe a shifting operation in which the ratio of the splitter group transmission unit and the ratio of the main transmission unit are changed in the same direction.

As the actuating unit can advantageously be provided further for the synchronization of the main transmission unit, it is proposed that the group transmission device includes a main transmission unit which comprises at least one shifting means without a synchronizer ring. In this way, a structurally simple design of the main transmission unit can be obtained.

In a particularly preferred embodiment, the open- and/or closed-loop control unit is provided to adapt the actuating torque to at least one shifting operation to be executed by means of the main transmission unit. In this way, an advantageously fast synchronization of the main transmission unit can be obtained, which can be adapted to the synchronization of the splitter group transmission unit in a particularly advantageous way.

Advantageously, the open- and/or closed-loop control unit is provided for the synchronization of the main transmission unit and/or for the cancellation of a tooth-on-tooth position of the main transmission unit. In this way, a shifting comfort of the group transmission device can be improved further.

In an advantageous further development, the actuating unit is in at least one operating mode designed as a hybrid drive module which is provided to make available a drive torque. In this way, the group transmission device can advantageously be used for drive and/or for energy recuperation.

The group transmission device may further be a twin-clutch gearbox. In this way, a simple synchronization of a group transmission device in the form of a twin-clutch gearbox can be achieved.

The invention will become more readily apparent from the following description of a particular embodiment of the invention. The drawing, the description and the claims contain numerous features in combination. These features may be considered individually as well as combined in further meaningful combinations thereof.

DESCRIPTION OF A PARTICULAR EMBODIMENT

Figure 1:
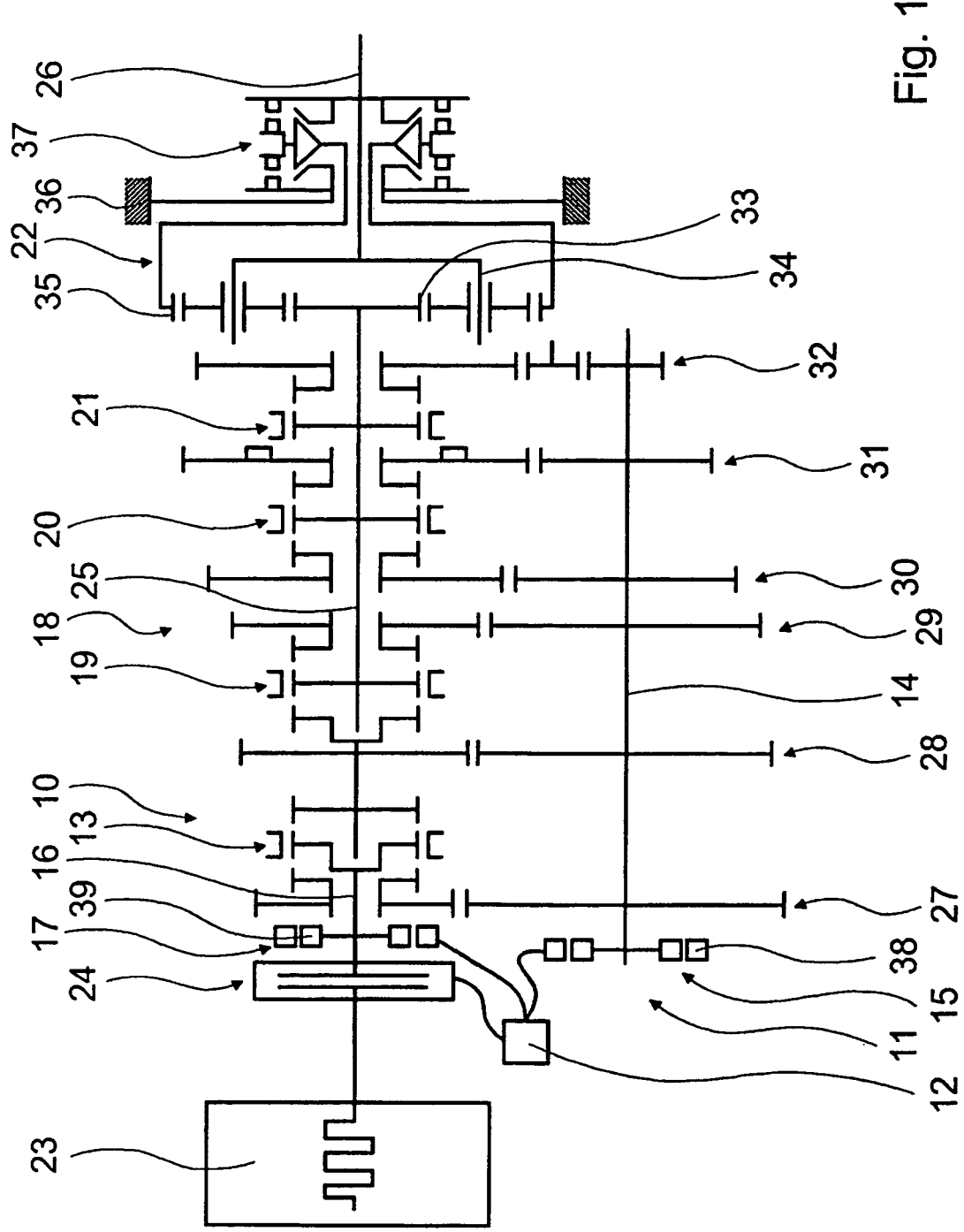
FIG. 1 shows a drive train with a group transmission device comprising a countershaft actuating means and an input shaft actuating means.

FIG. 1 shows a motor vehicle drive train with an exemplary group transmission device comprising a main transmission unit 18 and a splitter group transmission unit 10. By means of the main transmission unit 18, a number of main gears can be selected. By means of the splitter group transmission unit 10, the main gears selectable by means of the main transmission unit 18 can in each case be shifted to a fast split gear and a slow split gear. In addition, the group transmission device comprises a range change group unit 22, by means of which the split gears which can be formed by means of the main transmission unit 18 and the splitter group transmission unit 10 are divided into two gear ranges. The drive train further comprises a primary motor 23 in the form of an internal combustion engine. The primary motor 23 is located in a power flow upstream of the group transmission device.

The group transmission device further comprises a starting clutch 24 and an input shaft 16 connected to the starting clutch 24. The input shaft 16 is located in a power flow between the starting clutch 24 and the splitter group transmission unit 10. The transmission device further comprises an intermediate shaft 25, which is located in the power flow between the main transmission unit 18 and the range change group unit 22. In addition, the group transmission device comprises an output shaft 26, which is located downstream of the range change group unit 22 in the power flow.

The splitter group transmission unit 10 is in the form of an auxiliary transmission design. The splitter group transmission unit 10 comprises a countershaft 14 extending parallel to the input shaft 16. To connect the input shaft 16 to the countershaft 14, the splitter group transmission unit 10 comprises two gear planes 27, 28 and a shifting means 13 for selecting the gear planes 27, 28. By means of two gear planes 27, 28, two different ratios can be selected to form the split gears of the splitter group transmission unit 10. The shifting means 13 of the splitter group transmission unit 10 is designed as a non-synchromesh jaw clutch. The splitter group transmission unit 10 therefore only comprises shifting means 13 without a synchronizer ring.

The main transmission unit 18 is likewise configured in an auxiliary transmission design. The countershaft 14 is designed as a single piece for the splitter group transmission unit 10 and the main transmission unit 18. To connect the countershaft 14 to the intermediate shaft 25, the main transmission unit 18 has four gear planes 29, 30, 31, 32 and three shifting means 10, 20, 21 for the selection of the gear planes 29, 30, 31, 32. By means of the three gear planes 29, 30, 31, three main gears designed as forward gears can be selected. The gear plane 32 is provided for the selection of reverse gears. To provide a direct drive, the intermediate shaft 25 can be non-rotatably connected to the input shaft 16 by means of the two shifting means 13, 19. The shifting means 19, 20, 21 of the main transmission unit 18 are designed as non-synchromesh jaw clutches. The main transmission unit 18 therefore only comprises shifting means 19, 20, 21 without a synchronizer ring.

The range change group unit 22 is configured in a planetary gear transmission. It comprises a sun gear 33 which can be connected for rotation with the intermediate shaft 25. It further comprises a planet carrier 34 which is non-rotatably connected to the output shaft 26 and an internal gear 35. For the selection of the gear ranges, the range change group unit 22 is provided with a shifting means 37, by means of which the internal gear 35 can be connected either to a transmission housing 36 or to the sun gear 33. The shifting means 37 is a synchronized jaw clutch. For synchronization, the shifting means 37 comprises two synchronizer rings by means of which a frictional connection is established between shifting components of the shifting means 37 which are to be coupled in a shifting operation.

For shifting operations in which an overall ratio of the group transmission device is changed, the group transmission device comprises an active actuating unit 11 by means of which an actuating torque can be introduced into the main transmission unit 18 and the splitter group transmission unit 10. The group transmission device further comprises an open- and closed-loop control unit 12, by means of which the actuating torque introduced into the main transmission unit 18 and the actuating torque introduced into the splitter group transmission unit 10 can be adapted to shifting operations of the group transmission device to be executed by means of the group transmission device, in particular to shifting operations to be executed by means of the splitter group transmission unit 10.

The actuating torques which can be set by means of the actuating unit 11 are at least in sub-ranges infinitely variable between a lower and an upper limit value. The lower limit value is less than zero, which corresponds to a pickup of actuating torques. The upper limit value is more than zero, which corresponds to a delivery of actuating torques. The actuating unit 11 is independent of the primary motor 23.

In shifting operations executed by means of the group transmission device, the actuating torque is adapted to the respective shifting operation. In shifting operations executed by means of the splitter group transmission unit 10, a shifting position of the shifting means 13 of the splitter group transmission device 10 is changed. A shifting position of the shifting means 19, 20, 21 of the main transmission unit 18 can also be changed in such a shifting operation. Shifting positions of the shifting means 19, 20, 21 of the main transmission unit 18 may alternatively be retained in such a shifting operation.

By means of the actuating torque introduced by the actuating unit 11 into the splitter group transmission unit 10, the splitter group transmission unit 10 is synchronized. The shifting means 13 of the splitter group transmission unit comprises an input coupling element and two output coupling elements. The input coupling element is configured as an axially displaceable sliding sleeve which can be optionally connected to one of the two output coupling elements configured as selector forks.

During the synchronization of the splitter group transmission unit 10, a speed of the input coupling element and a speed of the output coupling element to be selected are brought close to each other, until a positive connection can be established between the input coupling element and the output coupling element to be selected. For this purpose, the actuating unit 11 is actively connected to the input coupling element and the two output coupling elements of the shifting means 13. In a shifting operation, the open- and closed-loop control unit 12 matches the actuating torque to a speed 45 of the input shaft 16 and a speed 44 of the countershaft 14. The speed 45 of the input shaft 16 and the speed 44 of the countershaft 14 can be determined individually by means of a sensor unit not shown in detail. In a shifting operation, the speeds 44, 45 are adjusted by means of the actuating unit 11 to a set speed for shifting the splitter group transmission unit 10 or to a set speed for shifting the main transmission unit 18. In addition, the open- and closed-loop control unit 12 can preset a speed 46 for the primary motor 23. The speed 46 preset for the primary motor 23 is adjusted by means of a further open- and closed-loop control unit not shown in detail, which is connected to the open- and closed-loop control unit 12.

To adjust the speed 44 of the countershaft 14, the actuating unit 11 comprises a countershaft actuating means 15, by means of which an actuating torque for the countershaft 14 can be set. The countershaft actuating means 15 introduces the actuating torque directly into the countershaft. The countershaft 14 is actively joined to the output coupling elements by means of the two gear planes 27, 28. By means of the countershaft actuating means 15, the speeds of the output coupling elements can therefore be adjusted.

To adjust the speed 45 of the input shaft 16, the actuating unit 11 comprises an input shaft actuating means 17, by means of which an actuating torque for the input shaft 16 can be set. The input shaft actuating means 17 introduces the actuating torque into of the input shaft 16. The input shaft 16 is connected to the input coupling element. By means of the input shaft actuating means 17, the speeds of the output coupling element can therefore be adjusted.

The countershaft actuating means 15 and the input shaft actuating means 17 are provided with electric motors 38, 39, by means of which actuating torques can be picked up and delivered. In order to pick up actuating torques, the electric motors 38, 39 are, in dependence of an operating mode preset by means of the open- and closed-loop control unit 12, either operated as generators or energized with a counter-current direction. The electric motor 38 of the countershaft actuating means 15 is arranged coaxial with the countershaft 14. The electric motor 39 of the input shaft actuating means 17 is arranged coaxial with the input shaft 16. In principle, however, an offset arrangement, for example involving gears, is conceivable.

By means of the open- and closed-loop control unit 12, at least all shifting operations of the shifting means 13 of the splitter group transmission unit 10 are synchronized. By means of the open- and closed-loop control unit 12, tooth-on-tooth positions of the shifting means 13 of the splitter group transmission unit 10 are further cancelled. In addition, by means of the open- and closed-loop control unit 12, shifting operations of the shifting means 19, 20, 21 of the main transmission unit 18 can be synchronized. In addition, by means of the open- and closed-loop control unit 12, tooth-on-tooth positions of the shifting means 19, 20, 21 of the main transmission unit 18 can be cancelled. For synchronization and for cancelling tooth-on-tooth positions, the countershaft actuating means 15 and the input shaft actuating means 17 are independently adjustable by means of the open- and closed-loop control unit 12. Depending on a shifting operation to be executed and/or the tooth-on-tooth position to be cancelled, an actuating torque is applied to the countershaft 14 or to the input shaft 16.

In an opposite-direction shifting operation, in which a ratio of the splitter group transmission unit 10 and a ratio of the main transmission unit 18 are changed in opposite directions, the actuating torque is applied to the countershaft 14. In a shifting operation in which only the splitter group transmission unit 10 is shifted, the actuating torque is applied to the input shaft 16. In a same-direction shifting operation, in which the ratio of the splitter group transmission unit 10 and the ratio of the main transmission unit 18 are changed in the same direction, the actuating torque is applied to the input shaft 16. Alternative operating modes are also conceivable.

A same-direction downshifting operation is advantageously executed by means of the input shaft actuating means 17. In the downshifting operation, the main transmission unit 18 is shifted from a high main gear to a low main gear. In addition, the splitter group transmission unit 10 is shifted from a fast split gear to a slow split gear. To initiate the shifting operation, the open- and closed-loop control unit 12 first shifts the main transmission unit 10 to the neutral position. In addition, the open- and closed-loop control unit 12 opens the starting clutch 24.

Figure 2:
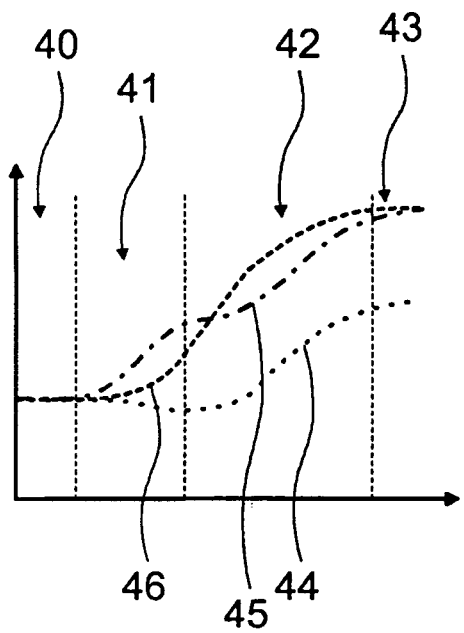
FIG. 2 is a flow chart of a shifting operation represented by a same-direction downshifting operation involving the use of the input shaft actuating means.

In a first phase 40 of the shifting operation, the open- and closed-loop con-trot unit 12 shifts the splitter group transmission unit 10 from the fast split gear to the neutral position. In a second phase 41, the open- and closed-loop control unit 12 increases, by means of the input shaft actuating means 17, the speed 45 of the input shaft 16 to the set speed for shifting the splitter group transmission unit 10. As soon as the input shaft 16 has reached the set speed for shifting the splitter group transmission unit 10, the open- and closed-loop control unit 12 shifts the splitter group transmission unit 10 to the slow split gear. Simultaneously with the increase of the speed 45 of the input shaft 16, the open- and closed-loop control unit 12 sets an increase of the speed 46 of the primary motor 23. In a third phase 42, the open- and closed-loop control unit 12 closes the starting clutch 24. The speed 46 of the primary motor 23 is increased further in this process, until it reaches the set speed preset by the open- and closed-loop control unit 12 for shifting the main transmission unit 18. By closing the starting clutch 24, the speed 45 of the input shaft 16 is increased until it equals the speed 46 of the primary motor 23. As soon as the speed 46 of the primary motor 23 reaches the set speed for shifting the main transmission unit 18, the main transmission unit 18 is shifted to the lower main gear in a fourth phase 43, whereby the shifting operation is completed (cf. FIG. 2).

The same-direction downshifting operation can alternatively be executed by means of the countershaft actuating means 15. To initiate the shifting operation, the open- and closed-loop control unit 12 first shifts the main transmission unit 18 to the neutral position. In addition, the open- and closed-loop control unit 12 opens the starting clutch 24.

Figure 3:
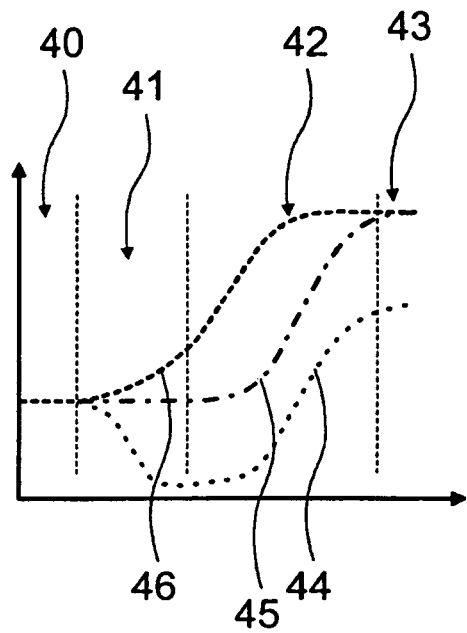
FIG. 3 is a flow chart of a shifting operation represented by a same-direction downshifting operation involving the use of the countershaft actuating means.

In the first phase 40 of the shifting operation, the open- and closed-loop control unit 12 shifts the splitter group transmission unit 10 from the fast split gear to the neutral position. In the second phase 41, the open- and closed-loop control unit 12 reduces, by means of the countershaft actuating means 15, the speed 44 of the countershaft 14 to the set speed for shifting the splitter group transmission unit 10. As soon as the countershaft 14 has reached the set speed for shifting the splitter group transmission unit 10, the open- and closed-loop control unit 12 shifts the splitter group transmission unit to the slow split gear. Simultaneously with the reduction of the speed 44 of the countershaft 14, the open- and closed-loop control unit 12 sets an increase of the speed 46 of the primary motor 23. In the third phase 42, the open- and closed-loop control unit 12 closes the starting clutch 24. The speed 46 of the primary motor 23 is increased further in this process, until it reaches the set speed preset by the open- and closed-loop control unit 12 for shifting the main transmission unit 18. By closing the starting clutch 24, the speed 45 of the input shaft 16 is increased to the speed 46 of the primary motor 23. As soon as the speed 46 of the primary motor 23 reaches the set speed for shifting the main transmission unit 18, the main transmission unit 18 is shifted to the lower main gear in the fourth phase 43, whereby the shifting operation is completed (cf. FIG. 3).

An opposite-direction downshifting operation is advantageously executed by means of the countershaft actuating means 15. In the downshifting operation, the main transmission unit 10 is shifted from a high main gear to a low main gear. In addition, the splitter group transmission unit 10 is shifted from a slow split gear to a fast split gear. To initiate the shifting operation, the open- and closed-loop control unit 12 first shifts the main transmission unit 10 to the neutral position. In addition the open- and closed-loop control unit 12 opens the starting clutch 24.

Figure 4:
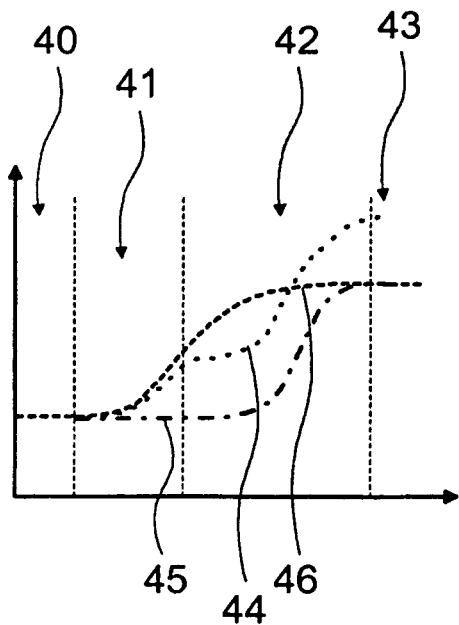
FIG. 4 is a flow chart of a shifting operation represented by an opposite-direction downshifting operation involving the use of the countershaft actuating means.

In the first phase 40 of the shifting operation, the open- and closed-loop control unit 12 shifts the splitter group transmission unit 10 from the slow split gear to the neutral position. In the second phase 41, the open- and closed-loop control unit 12 increases, by means of the countershaft actuating means 15, the speed 44 of the countershaft 14 to the set speed for shifting the splitter group transmission unit 10. As soon as the countershaft 14 has reached the set speed for shifting the splitter group transmission unit 10, the open- and closed-loop control unit 12 shifts the splitter group transmission unit 10 to the fast split gear. Simultaneously with the increase of the speed 44 of the countershaft 14, the open- and closed-loop control unit 12 sets an increase of the speed 46 of the primary motor 23. In the third phase 42, the open- and closed-loop control unit 12 closes the starting clutch 24. The speed 46 of the primary motor 23 is increased further in this process, until it reaches the set speed preset by the open- and closed-loop control unit 12 for shifting the main transmission unit 18. By closing the starting clutch 24, the speed 45 of the input shaft 16 is increased until it equals the speed 46 of the primary motor 23. As soon as the speed 46 of the primary motor 23 reaches the set speed for shifting the main transmission unit 18, the main transmission unit 18 is shifted to the lower main gear in the fourth phase 43, whereby the shifting operation is completed (cf. FIG. 4).

The opposite-direction downshifting operation can alternatively be executed by means of the input shaft actuating means 17. To initiate the shifting operation, the open- and closed-loop control unit 12 first shifts the main transmission unit 18 to the neutral position. In addition, the open- and closed-loop control unit 12 opens the starting clutch 24.

Figure 5:
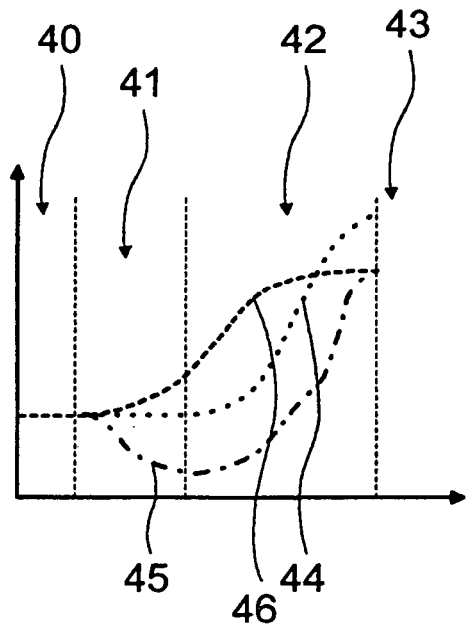
FIG. 5 is a flow chart of a shifting operation represented by an opposite-direction downshifting operation involving the use of the input shaft actuating means.

In the first phase 40 of the shifting operation, the open- and closed-loop control unit 12 shifts the splitter group transmission unit 10 from the slow split gear to the neutral position. In the second phase 41, the open- and closed-loop control unit 12 reduces, by means of the input shaft actuating means 17, the speed 45 of the input shaft 16 to the set speed for shifting the splitter group transmission unit 10. As soon as the input shaft 16 has reached the set speed for shifting the splitter group transmission unit 10, the open- and closed-loop control unit 12 shifts the splitter group transmission unit 10 to the slow split gear. Simultaneously with the reduction of the speed 45 of the input shaft 16, the open- and closed-loop control unit 12 sets an increase of the speed 46 of the primary motor 23. In the third phase 42, the open- and closed-loop control unit 12 closes the starting clutch 24. The speed 46 of the primary motor 23 is increased further in this process, until it reaches the set speed preset by the open- and closed-loop control unit 12 for shifting the main transmission unit 18. By closing the starting clutch 24, the speed 45 of the input shaft 16 is increased until it equals the speed 46 of the primary motor 23. As soon as the speed 46 of the primary motor 23 reaches the set speed for shifting the main transmission unit 18, the main transmission unit 18 is shifted to the lower main gear in the fourth phase 43, whereby the shifting operation is completed (cf. FIG. 5).

In an alternative operating mode, the open- and closed-loop control unit 12 does not close the starting clutch in the downshifting operations in the third phase 42. In contrast, the speed 45 of the input shaft 16 is in the third phase 42 adjusted by means of the input shaft actuating means 17 and/or by means of the countershaft actuating means 15 to the set speed for shifting the main transmission unit 18. As soon as the speed 45 of the input shaft 16 reaches the set speed for shifting the main transmission unit 18, the main transmission unit 18 is shifted to the lower main gear in the fourth phase 43. The starting clutch 24 is then closed, whereby the downshifting operation is completed.

A same-direction upshifting operation is advantageously executed by means of the input shaft actuating means 17. In the upshifting operation, the main transmission unit 10 is shifted from a low main gear to a higher main gear. In addition, the splitter group transmission unit 10 is shifted from a slow split gear to a fast split gear. To initiate the shifting operation, the open- and closed-loop control unit 12 first shifts the main transmission unit 18 to the neutral position. In addition the open- and closed-loop control unit 12 opens the starting clutch 24.

Figure 6:
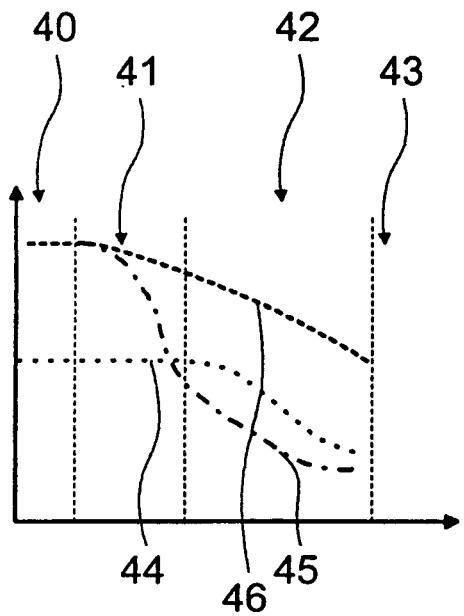
FIG. 6 is a flow chart of a shifting operation represented by a same-direction upshifting operation involving the use of the input shaft actuating means.

In the first phase 40 of the shifting operation, the open- and closed-loop control unit 12 shifts the splitter group transmission unit 10 from the slow split gear to the neutral position. In the second phase 41, the open- and closed-loop control unit 12 reduces, by means of the input shaft actuating means 17, the speed 45 of the input shaft 16 to the set speed for shifting the splitter group transmission unit 10. The set value for the speed 45 is lower than the speed 44 of the countershaft 14 in the second phase 41. As soon as the input shaft 16 has reached the set speed for shifting the splitter group transmission unit 10, the open- and closed-loop control unit 12 shifts the splitter group transmission unit 10 to the fast split gear. Simultaneously with the reduction of the speed 45 of the input shaft 16, the open- and closed-loop control unit 12 sets a reduction of the speed 46 of the primary motor 23. In the third phase 42, the open- and closed-loop control unit 12 further reduces the speed 45 of the input shaft 16 by means of the input shaft actuating means 17. Simultaneously with the further reduction of the speed 45 of the input shaft 16, the speed 46 of the primary motor 23 is reduced further. As soon as the speed 45 of the input shaft 16 reaches the set speed for shifting the main transmission unit 18, the main transmission unit 18 is shifted to the higher main gear in the fourth phase 43. The starting clutch 24 is then closed, whereby the shifting operation is completed (cf. FIG. 6).

The same-direction upshifting operation can alternatively be executed by means of the countershaft actuating means 15. To initiate the shifting operation, the open- and closed-loop control unit 12 first shifts the main transmission unit 18 to the neutral position. In addition, the open- and closed-loop control unit 12 opens the starting clutch 24.

Figure 7:
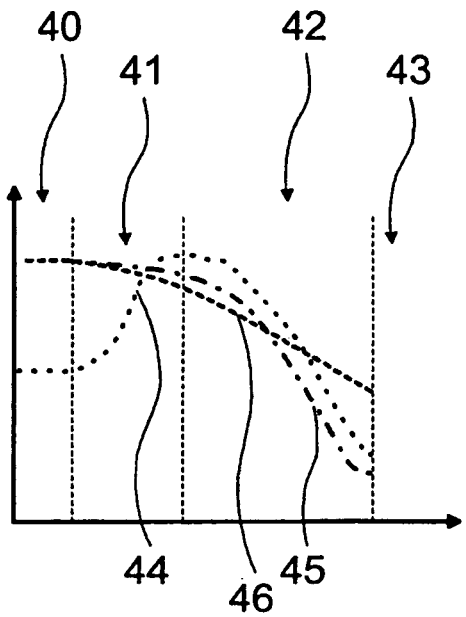
FIG. 7 is a flow chart of a shifting operation represented by a same-direction upshifting operation involving the use of the countershaft actuating means.

In the first phase 40 of the shifting operation, the open- and closed-loop control unit 12 shifts the splitter group transmission unit 10 from the slow split gear to the neutral position. In the second phase 41, the open- and closed-loop control unit 12 increases, by means of the countershaft actuating means 15, the speed 44 of the countershaft 14 to the set speed for shifting the splitter group transmission unit 10. As soon as the countershaft 14 has reached the set speed for shifting the splitter group transmission unit 10, the open- and closed-loop control unit 12 shifts the splitter group transmission unit 10 to the fast split gear. Simultaneously with the increase of the speed 44 of the countershaft 14, the open- and closed-loop control unit 12 sets a reduction of the speed 46 of the primary motor 23. In the third phase 42, the open- and closed-loop control unit 12 reduces the speed 44 of the countershaft 14 by means of the countershaft actuating means 15. Simultaneously with the reduction of the speed 44 of the countershaft 14, the speed 46 of the primary motor 23 is reduced further. As soon as the speed 44 of the countershaft 14 reaches the set speed for shifting the main transmission unit 18, the main transmission unit 18 is shifted to the higher main gear in the fourth phase 43. The starting clutch 24 is then closed, whereby the shifting operation is completed (cf. FIG. 7).

An opposite-direction upshifting operation is advantageously executed by means of the countershaft actuating means 15. In the upshifting operation, the main transmission unit 18 is shifted from a low main gear to a higher main gear. In addition, the splitter group transmission unit 10 is shifted from a fast split gear to a slow split gear. To initiate the shifting operation, the open- and closed-loop control unit 12 first shifts the main transmission unit 18 to the neutral position. In addition the open- and closed-loop control unit 12 opens the starting clutch 24.

Figure 8:
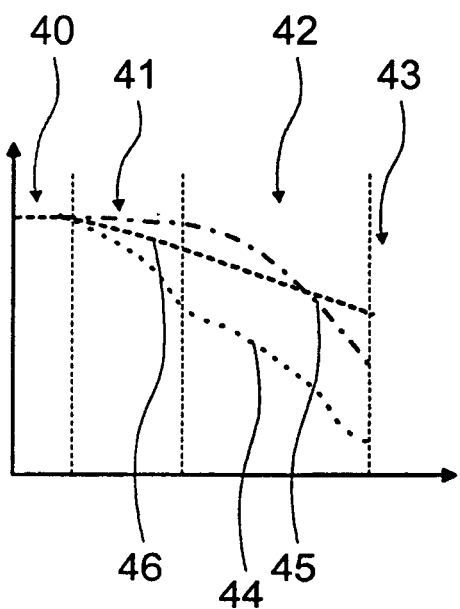
FIG. 8 is a flow chart of a shifting operation represented by an opposite-direction upshifting operation involving the use of the countershaft actuating means.

In the first phase 40 of the shifting operation, the open- and closed-loop control unit 12 shifts the splitter group transmission unit 10 from the fast split gear to the neutral position. In the second phase 41, the open- and closed-loop control unit 12 reduces, by means of the countershaft actuating means 15, the speed 44 of the countershaft 14 to the set speed for shifting the splitter group transmission unit 10. As soon as the countershaft 14 has reached the set speed for shifting the splitter group transmission unit 10, the open- and closed-loop control unit 12 shifts the splitter group transmission unit 10 to the slow split gear. Simultaneously with the reduction of the speed 44 of the countershaft 14, the open- and closed-loop control unit 12 sets a reduction of the speed 46 of the primary motor 23. In the third phase 42, the open- and closed-loop control unit 12 further reduces the speed 44 of the countershaft 14 by means of the countershaft actuating means 15. Simultaneously with the reduction of the speed 44 of the countershaft 14, the speed 46 of the primary motor 23 is reduced further. As soon as the speed 44 of the countershaft 14 reaches the set speed for shifting the main transmission unit 18, the main transmission unit 18 is shifted to the higher main gear in the fourth phase 43. The starting clutch 24 is then closed, whereby the shifting operation is completed (cf. FIG. 8).

The opposite-direction downshifting operation can alternatively be executed by means of the input shaft actuating means 17. To initiate the shifting operation, the open- and closed-loop control unit 12 first shifts the main transmission unit 18 to the neutral position. In addition, the open- and closed-loop control unit 12 opens the starting clutch 24.

Figure 9:
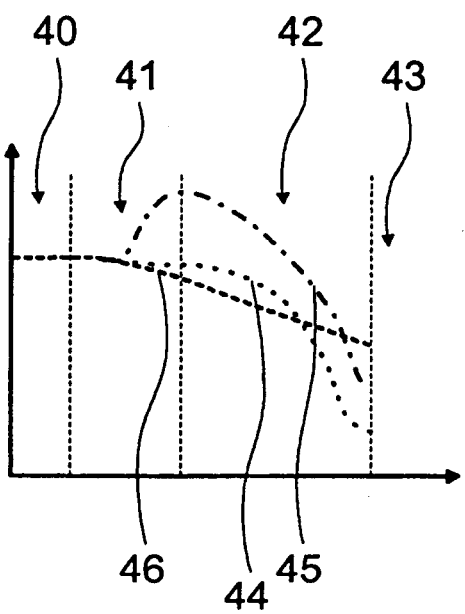
FIG. 9 is a flow chart of a shifting operation represented by an opposite-direction upshifting operation involving the use of the input shaft actuating means.

In the first phase 40 of the shifting operation, the open- and closed-loop control unit 12 shifts the splitter group transmission unit 10 from the fast split gear to the neutral position. In the second phase 41, the open- and closed-loop control unit 12 increases, by means of the input shaft actuating means 17, the speed 45 of the input shaft 16 to the set speed for shifting the splitter group transmission unit 10. As soon as the input shaft 16 has reached the set speed for shifting the splitter group transmission unit 10, the open- and closed-loop control unit 12 shifts the splitter group transmission unit 10 to the slow split gear. Simultaneously with the increase of the speed 45 of the input shaft 16, the open- and closed-loop control unit 12 sets a reduction of the speed 46 of the primary motor 23. In the third phase 42, the open- and closed-loop control unit 12 reduces the speed 45 of the input shaft 16 by means of the input shaft actuating means 17. Simultaneously with the reduction of the speed 45 of the input shaft 16, the speed 46 of the primary motor 23 is reduced further. As soon as the speed 46 of the input shaft 16 reaches the set speed for shifting the main transmission unit 18, the main transmission unit 18 is shifted to the higher main gear in the fourth phase 43. The starting clutch 24 is then closed, whereby the shifting operation is completed (cf. FIG. 9).

A shifting operation involving the splitter group transmission unit 10 only is executed by means of the input shaft actuating means 17. In this shifting operation, the splitter group transmission unit 10 changes the split gear while the main gear of the main transmission unit 18 is maintained. To initiate the shifting operation, the open- and closed-loop control unit 12 opens the starting clutch 24. The main transmission gear is retained throughout the shifting operation.

In a first phase of the shifting operation, the open- and closed-loop control unit 12 shifts the splitter group transmission unit 10 from the engaged split gear to the neutral position. In a second phase, the open- and closed-loop control unit 12 changes, by means of the input shaft actuating means 17, the speed 45 of the input shaft 16 to the set speed for shifting the splitter group transmission unit 10. As soon as the countershaft 14 has reached the set speed for shifting the splitter group transmission unit 10, the open- and closed-loop control unit 12 shifts the splitter group transmission unit 10 to the split gear to be engaged. In a third phase, the starting clutch 24 is closed, whereby the shifting operation is completed.

In order to cancel a tooth-on-tooth position in the main transmission unit 10, the starting clutch 24 is opened. The tooth-on-tooth position is then cancelled by means of the countershaft actuating means 15. If a split gear is engaged, the tooth-on-tooth position can in addition or alternatively be cancelled by means of the input shaft actuating means 17.

In shifting operations which involve the main transmission unit 18 only, the shifting means 19, 20, 21 of the main transmission unit 18 are also synchronized by means of the actuating unit 11. If the starting clutch 24 is open, the main transmission unit 18 is synchronized by means of the countershaft actuating means 15. If a split gear is engaged, the main transmission unit 18 can in addition or alternatively be synchronized by means of the input shaft actuating means 17.

In an operating mode in which the drive train is firmly closed non-positively, the actuating unit 11 can be operated as a hybrid drive module by means of which an additional drive torque can be provided. In this operating mode, in which the splitter group transmission unit 10, the main transmission unit 18 and the range change group unit 22 are shifted, the actuating torque which can be provided by the actuating unit 11 acts in addition to a drive torque of the primary drive unit 23. By means of the actuating unit designed as a hybrid drive module in this operating mode, a boost mode and/or a recuperation mode is/are made available. In addition, by means of the actuating unit 11, for example by shifting the main transmission unit 18 to the neutral position and by closing the starting clutch 24, a hybrid drive module in the form of a starter-generator module can be provided.

What is claimed is:

1. A group transmission device comprising a main transmission unit (18) and a splitter group transmission unit (10), and an actuating unit (11) for introducing an actuating torque into the splitter group transmission unit (10) via an input shaft (16), the group transmission device further including an open- and/or closed-loop control unit (12) for adapting the actuating torque introduced into the splitter group transmission unit (10) for the synchronization of the splitter group transmission unit (10) so as to permit at least one shifting operation to be executed by means of the splitter group transmission unit (10), the splitter group transmission unit (10) comprising at least one shifting means (13) without synchronizer ring for connecting the input shaft (1c) to the actuating unit (11), the actuating unit (11) comprising a countershaft actuating means (15) for providing an actuating torque acting on a countershaft (14), and the control unit (12) being, at least in one shifting operation to be executed in opposite direction in the main transmission unit (18) and the splitter group transmission unit (10), adapted to set an actuating torque for the actuating means (15) of the countershaft (14) so as to permit smooth engagement of the at least one shifting means (13).

2. The group transmission device according to claim 1, wherein the actuating unit (11) is provided to accommodate an actuating torque and to deliver an actuating torque.

3. The group transmission device according to claim 1, wherein the open- and/or closed-loop control unit (12) is provided to adapt and/or to change the actuating torque introduced into the splitter group transmission unit (10) during the shifting operation.

4. The group transmission device according to claim 1, wherein the open- and/or closed-loop control unit (12) is provided to cancel a tooth-on-tooth position of the splitter group transmission unit (10).

5. The group transmission device according to claim 1, wherein the actuating unit (11) comprises at least one input shaft actuating means (17) which is provided for establishing an actuating torque acting on the input shaft (16).

6. The group transmission device according to claim 5, wherein the open- and/or closed-loop control unit (12) is, in at least one shifting operation to be executed in the same direction in the main transmission unit (10) and the splitter group transmission unit (10), provided to set an actuating torque for the input shaft (16).

7. The group transmission device according to claim 1, wherein a main transmission unit (18) comprising at least one shifting means (19, 20, 21) without a synchronizer ring.

8. The group transmission device according to claim 7, wherein the control unit (12) adapts the actuating torque to at least one shifting operation to be executed by the main transmission unit (18).

9. The group transmission device according to claim 7, wherein the control unit (12) provides for synchronization of the main transmission unit and/or to cancel a tooth-on-tooth position of the main transmission unit (12).

10. The group transmission device according to claim 1, wherein the actuating unit (11) assumes, in at least one operating mode, a hybrid drive module presence for making available a drive torque.

* * * * *